United States Patent

[11] 3,634,165

| [72] | Inventors | Vern L. Gliniecki<br>Bay City;<br>Kenneth E. Flammang, Midland, both of Mich. |
|---|---|---|
| [21] | Appl. No. | 31,452 |
| [22] | Filed | Apr. 1, 1970 |
| [45] | Patented | Jan. 11, 1972 |
| [73] | Assignee | The Dow Chemical Company<br>Midland, Mich.<br>Original application Jan. 10, 1967, Ser. No. 609,715, now abandoned. Divided and this application Apr. 1, 1970, Ser. No. 31,452 |

[54] METHOD OF MAKING A LAMINATE COMPRISED OF POLYVINYL CHLORIDE
10 Claims, No Drawings

[52] U.S. Cl................................................ 156/244, 156/306, 161/255

[51] Int. Cl. ........................................................ B29c 19/00
[50] Field of Search........................................... 156/244, 306, 247, 252, 253, 254; 161/255

[56] References Cited

UNITED STATES PATENTS

| 3,323,965 | 6/1967 | Hanle et al.................... | 156/244 |
| 3,356,765 | 12/1967 | Musso et al................... | 156/244 X |
| 3,453,173 | 7/1969 | Isley et al...................... | 156/244 X |
| 3,480,508 | 11/1969 | Roy............................... | 156/306 X |

*Primary Examiner*—Carl D. Quarforth
*Assistant Examiner*—Stephen J. Lechert, Jr.
*Attorneys*—Griswold & Burdick, Robert B. Ingraham and Richard G. Waterman

ABSTRACT: Laminates of vinyl chloride polymers and blends of styrene acrylonitrile polymers are formed by extrusion lamination without the need of adhesives.

METHOD OF MAKING A LAMINATE COMPRISED OF POLYVINYL CHLORIDE

This application is a divisional application of our copending application Ser. No. 609,715, filed Jan. 10, 1967.

This invention relates to a laminate of synthetic resinous sheets, and more particularly relates to an improved laminate particularly adapted for use in refrigerators and the like.

There are many applications wherein a laminated thermoplastic resinous sheet is desirable. Such applications include linings for household refrigerators and the like where significant resistance to contact with oils and fatty substances is required. Desirably, a styrene polymer is utilized for such applications because of its low cost and reformability. However, the chemical resistance of a vinyl chloride polymer is preferred. In order to obtain the best properties of each, laminates have been prepared of vinyl chloride polymers and styrene polymers employing adhesives. The use of adhesives is extremely undesirable in that oftentimes delamination occurs either before forming of the laminate or during or later in service. Bubbling frequently takes place at the interface and oftentimes residual solvent from a solvent adhesive system contributes to undesired weakening of one or both of the components of the laminate and oftentimes requires an excessive length of time for the removal thereof.

It would be beneficial if there were available an improved laminate of vinyl chloride polymer and styrene polymer which did not require a third adhesive component.

It would also be beneficial if there were available an improved laminate of a vinyl chloride polymer and a styrene polymer which is readily formed without adhesives.

These benefits and other advantages in accordance with the present invention are achieved in a method for preparing a laminate of a vinyl chloride polymer comprising preparing a sheet of a vinyl chloride polymer, the vinyl chloride polymer being selected from the group consisting of:

a. polyvinyl chloride having a solution viscosity of from about 1.5 to about 3 centipoise, the solution viscosity being a viscosity of a 2 weight percent solution of the polymer in o-dichlorobenzene at 120° C., b. polymers of vinyl chloride with up to 20 weight percent of a monoolefinically unsaturated monomer copolymerizable therewith selected from a group consisting of methylmethacrylate, ethyl acrylate, vinyl acetate, methyl styrene, diethyl maleate, acrylonitrile and butadiene, c. blends of polyvinyl chloride as set forth in (a) with from 3-30 weight percent (based on the blend of polymer selected from the polymers of (b) and isotactic polybutadiene, applying to the vinyl chloride polymer sheet in heat-plastified form a sheet of an alkenyl aromatic resinous polymer of 50-90 weight percent of an alkenyl aromatic monomer containing from six to 10 carbon atoms of the benzene series and having the vinyl group directly attached to the ring and from 10 to 34 weight percent acrylonitrile and from 0 to 20 weight percent polybutadiene, contacting the heat-plastified sheet of alkenyl aromatic resinous polymer with the sheet of vinyl chloride polymer under pressure sufficient to cause bonding of the vinyl chloride polymer to the alkenyl aromatic resinous polymer, and subsequently cooling the resultant composite sheet below its thermoplastic temperature.

Vinyl chloride polymers meeting the requirements of the present invention include copolymers of from 97 to about 85 weight percent vinyl chloride with 3 to 15 weight percent vinyl acetate; 97 to 85 weight percent vinyl chloride with 3 to 15 weight percent acetyl vinyl ether; a blend of polyvinyl chloride with from about 5 to 15 weight percent of the total mixture being an acrylonitrile butadiene copolymer having a composition of about 25 weight percent acrylonitrile; 10 weight percent butadiene rubber at 65 weight percent styrene; a copolymer of from about 97 to 85 weight percent vinyl chloride with 3 to 15 weight percent diethylmaleate polyvinyl chloride plasticized with from about 2 to 10 percent by weight of epoxidized soybean oil; a copolymer from about 97 to 85 weight percent vinyl chloride and 3 to 15 weight percent vinyl propionate, a copolymer of from 97 to 85 weight percent vinyl chloride and 3 to 15 weight percent vinyl pimelate, a copolymer of from about 97 to 85 weight percent vinyl chloride with 3 to 15 weight percent vinyl crotonate blends of polyvinyl chloride and 5 to 25 weight percent of a copolymer of from about 70 weight to 95 weight percent of vinyl chloride with from about 30 to 5 weight percent vinylidene chloride. Also useful in the practice of the present invention are blends of polyvinyl chloride with minor portions of chlorinated polyethylene.

Particularly beneficial are compositions of matter comprising an intimate admixture of (A) from 70 to 92 percent by weight of at least one vinyl chloride polymer consisting of at least 85 percent by weight vinyl chloride and not more than 15 percent by weight of a different ethylenically unsaturated monomer that is copolymerizable with vinyl chloride and (B) from 8 to 30 percent by weight of a copolymer of a mixture of monomers consisting of (C) from 30 to 50 percent by weight of a conjugated diolefin (D) from 10 and 45 percent by weight of an alkenyl aromatic compound and (E) from 15 to 55 percent by weight of an ester selected from the group consisting of the methyl and ethyl esters of acrylic and methacrylic acids and (F) from 6 to 12 percent by weight of a compound selected from the group consisting of acrylonitrile and methacrylonitrile, the amount of F being expressed as a percentage of the total of C, D, E and F and the amount of each of C, D and E being expressed as a percentage of the total of C, D and E.

By the term "alkenyl aromatic monomer" is meant an alkenyl aromatic compound having the general formula:

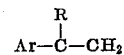

wherein "Ar" represents an aromatic hydrocarbon radical, or an aromatic halohydrocarbon radical of the benzene series, and "R" is hydrogen or the methyl radical. Examples of such alkenyl aromatic monomers are styrene, α-methylstyrene, ortho-methylstyrene, metamethylstyrene, para-methylstyrene, ar-ethylstyrene, ar-vinylxylene, ar-chlorostyrene, or ar-bromostyrene, and the like.

By the term "styrene polymer" or "alkenyl aromatic resin" is meant a solid polymer of one or more polymerizable alkenyl aromatic compounds. The polymer or copolymer comprises, in chemically combined form, at least 50–90 percent by weight of at least one alkenyl aromatic compound having the general formula:

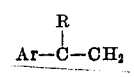

wherein "Ar" represents an aromatic hydrocarbon radical, or an aromatic halohydrocarbon radical of the benzene series, and "R" is hydrogen or the methyl radical with 10 to 34 weight percent acrylonitrile and 0 to 20 weight percent polybutadiene. Examples of such alkenyl aromatic monomers are styrene, α-methylstyrene, ortho-methylstyrene, metamethylstyrene, para-methylstyrene, Ar-ethylstyrene, Ar-vinylxylene, Ar-chlorostyrene, or Ar-bromostyrene; the mixtures of two or more of such alkenyl aromatic compounds with minor amounts of other readily polymerizable olefinic compounds such as methyl methacrylate.

The vinyl chloride polymers employed in the practice of the present invention are stabilized with conventional stabilizers without deterioration of the bond between the vinyl chloride and the styrene polymers. Such stabilizers can be organotin compounds such as dibutyl tin dilauryl acetomercaptide, barium-cadmium, barium-zinc, cadmium-zinc and lead.

Beneficially, light stabilizers may be incorporated into the vinyl chloride resins in proportions up to about one half weight percent. Some suitable light stabilizers are benzophenones such as 2-hydroxy-4-pentadecyl benzophenone, dibenzoyl resorcinol. Trisbiphenyl phosphite may also be employed as an antioxidant if desired.

Conventional plasticizers may be utilized in the vinyl chloride polymer often in quantities up to about 20 weight percent based on the weight of the resin. Di-2-hexyl phthalate, tricresyl phosphate and dibutyl phthalate may be employed up to the level of 20 weight percent. However, ethylene glycol dibenzoate is usable up to about 15 weight percent and epoxidized soybean oil can be tolerated to a level of 5 weight percent.

Mixtures of the foregoing plasticizers below the hereinabove mentioned levels are also eminently satisfactory. Conventional pigments and filler may be employed in both the vinyl chloride polymer and the styrene polymer. The styrene polymer sheet may contain usual additives such as lubricants, pigments, dyes and the like.

In preparing sheets in accordance with the present invention, beneficially the vinyl chloride polymer component is prepared as an unsupported sheet and the alkenyl aromatic resinous material extruded thereon and pressed between adjacent rolls while the alkenyl aromatic resin is in heat-plastified form and the resultant laminate cooled below the thermoplastic temperature.

The invention is further illustrated but not limited by the following examples:

EXAMPLE 1

A rigid vinyl chloride film 2 mils in thickness is prepared from a blend of an 80 weight percent polyvinyl chloride, 20 weight percent of a copolymer of 78 weight percent methyl methacrylate and 22 weight percent ethyl acrylate. The polymer blend had a solution viscosity of 1.645 as a 2 percent solution in o-dichlorobenzene at 120° C. An alkenyl aromatic resinous polymer is extruded onto a surface of the vinyl chloride film at a temperature of 358° F. The alkenyl aromatic resins comprised a polymer formed by polymerizing 40 weight percent tertiary butyl styrene, 30 weight percent styrene, 17 weight percent acrylonitrile in the presence of 13 weight percent isotactic polybutadiene rubber. The resultant polymer was then mixed with 1 weight percent mineral oil, 0.4 weight percent dibenzoyl resorcinol. The resultant film had a vinyl chloride polymer layer 2 mils in thickness and an alkenyl aromatic resinous layer 50 mils in thickness. The resultant sheet is found to thermoform and exhibit strong adhesion between the layers.

EXAMPLE 2

The procedure of example 1 was repeated with the exception that the alkenyl aromatic resinous polymer is a polymer of 55 weight percent styrene, 24 weight percent acrylonitrile, 21 weight percent polybutadiene rubber. The resultant composite sheet thermoformed well and exhibits strong adhesion between the layers.

EXAMPLE 3

The procedure of example 1 was repeated with the exception that the alkenyl aromatic resinous polymer is a polymer of 84 weight percent styrene, 10 weight percent acrylonitrile and 6 weight percent of polybutadiene rubber.

EXAMPLE 4

The procedure of example 1 was repeated with the exception that the alkenyl aromatic resinous polymer is a polymer of 82 weight percent styrene and 18 weight percent acrylonitrile. The resultant sheet thermoforms well and exhibits strong adhesion between the layers.

EXAMPLE 5

The procedure of example 1 was repeated with the exception that the alkenyl aromatic resinous polymer is a polymer of 70 weight percent styrene and 30 weight percent acrylonitrile. The resultant composite sheet thermoforms well and exhibits strong adhesion between the layers.

EXAMPLE 6

The procedure of example 1 was repeated with the exception that the alkenyl aromatic resinous polymer is a polymer of 66 weight percent styrene and 34 weight percent acrylonitrile. The resultant composite sheet thermoforms well and exhibits strong adhesion between the layers.

EXAMPLE 7

A laminate was prepared by first preparing a film from a vinyl chloride polymer consisting of 60 weight percent of polyvinyl chloride having a solution viscosity of 1.7 centipoise and 40 percent of a vinyl chloride polymer which consisted of 80 weight percent of a polyvinyl chloride having a solution viscosity of 1.95 which was treated with 20 weight percent of a polymerizable mixture which consisted of 16 weight percent methyl styrene, 39 weight percent butadiene, 39 weight percent methyl methacrylate, 6 weight percent ethyl acrylate. The polyvinyl chloride was in granular form suspended in water in the presence of the monomer with 2/10ths of one percent lauryl peroxide and polymerized with agitation until the monomer had been converted into polymer. 100 parts of the blend of polyvinyl chloride resin was treated with 3 parts of dibutyl tin dilauryl acetomercaptide, 0.3 parts by weight mineral oil and 2 parts per million of calco oil violet. A 75-mil thick layer of the alkenyl aromatic resin of example 1 was extruded onto the surface of the vinyl chloride polymer film and passed between a heated roll. Excellent adhesion is obtained. The resultant laminate is formable.

EXAMPLE 8

The procedure of example 7 was repeated with the exception that the alkenyl aromatic resinous polymer is a polymer of 55 weight percent styrene, 24 weight percent acrylonitrile, 21 weight percent polybutadiene rubber. The resultant composite sheet thermoformed well and exhibits strong adhesion between the layers.

EXAMPLE 9

The procedure of example 7 was repeated with the exception that the alkenyl aromatic resinous polymer is a polymer of 84 weight percent styrene, 10 weight percent acrylonitrile and 6 weight percent of polybutadiene rubber.

EXAMPLE 10

The procedure of example 7 was repeated with the exception that the alkenyl aromatic resinous polymer is a polymer of 82 weight percent styrene and 18 weight percent acrylonitrile. The resultant sheet thermoforms well and exhibits strong adhesion between the layers.

EXAMPLE 11

The procedure of example 7 was repeated with the exception that the alkenyl aromatic resinous polymer is a polymer of 70 weight percent styrene and 30 weight percent acrylonitrile. The resultant composite sheet thermoforms well and exhibits strong adhesion between the layers.

EXAMPLE 12

The procedure of example 7 was repeated with the exception that the alkenyl aromatic resinous polymer is a polymer of 66 weight percent styrene and 34 weight percent acrylonitrile. The resultant composite sheet thermoforms well and exhibits strong adhesion between the layers.

EXAMPLE 13

A rigid polyvinyl chloride film having a thickness of 2 mils is prepared from polyvinyl chloride having a solution viscosity of 3 centipoise and an alkenyl aromatic resinous polymer sheet is extruded and thermally bonded to the polyvinyl chloride film at a temperature of about 420° F. The alkenyl aromatic resin employed to form the sheet is prepared from 56.5 weight percent styrene, 23.5 weight percent acrylonitrile and 20 weight percent polybutadiene rubber. The resultant laminate thermoforms readily and excellent adhesion is obtained between the layers.

EXAMPLE 14

The procedure of example 13 was repeated with the exception that the alkenyl aromatic resinous polymer is a polymer of 55 weight percent styrene, 24 weight percent acrylonitrile, 21 weight percent polybutadiene rubber. The resultant composite sheet thermoformed well and exhibits strong adhesion between the layers.

EXAMPLE 15

The procedure of example 13 was repeated with the exception that the alkenyl aromatic resinous polymer is a polymer of 84 weight percent styrene, 10 weight percent acrylonitrile and 6 weight percent of polybutadiene rubber.

EXAMPLE 16

The procedure of example 13 was repeated with the exception that the alkenyl aromatic resinous polymer is a polymer of 82 weight percent styrene and 18 weight percent acrylonitrile. The resultant sheet thermoforms well and exhibits strong adhesion between the layers.

EXAMPLE 17

The procedure of example 13 was repeated with the exception that the alkenyl aromatic resinous polymer is a polymer of 70 weight percent styrene and 30 weight percent acrylonitrile. The resultant composite sheet thermoforms well and exhibits strong adhesion between the layers.

EXAMPLE 18

The procedure of example 13 was repeated with the exception that the alkenyl aromatic resinous polymer is a polymer of 66 weight percent styrene and 34 weight percent acrylonitrile. The resultant composite sheet thermoforms well and exhibits strong adhesion between the layers.

EXAMPLE 19

A plasticized vinyl chloride polymer film having a thickness of 7 mils is prepared from a blend of 70 weight percent polyvinyl chloride and 30 weight percent of a copolymer which is 80 weight percent methyl methacrylate and 20 weight percent ethyl acrylate. The polymer blend has a solution viscosity of 1.5 centipoise and is plasticized by the addition of 16 parts by weight (per 100 parts of resin blend of di-2-ethyl hexyl phthalate). An alkenyl aromatic resinous polymer is heat laminated to the vinyl chloride polymer film by extrusion at a temperature of about 435° F. The alkenyl aromatic resin is formed by the polymerization of 55 weight percent styrene, 24 weight percent acrylonitrile and 21 weight percent polybutadiene rubber.

EXAMPLE 20

The procedure of example 19 was repeated with the exception that the alkenyl aromatic resinous polymer is a polymer of 84 weight percent styrene, 10 weight percent acrylonitrile and 6 weight percent of polybutadiene rubber.

EXAMPLE 21

The procedure of example 19 was repeated with the exception that the alkenyl aromatic resinous polymer is a polymer of 82 weight percent styrene and 18 weight percent acrylonitrile. The resultant sheet thermoforms well and exhibits strong adhesion between the layers.

EXAMPLE 22

The procedure of example 19 was repeated with the exception that the alkenyl aromatic resinous polymer is a polymer of 70 weight percent styrene and 30 weight percent acrylonitrile. The resultant composite sheet thermoforms well and exhibits strong adhesion between the layers.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method for preparing a laminate of a vinyl chloride polymer comprising
   preparing a sheet of a vinyl chloride polymer, the vinyl chloride polymer being selected from the group consisting of:
   a. polyvinyl chloride having a solution viscosity of from about 1.5 to about 3 centipoise, the solution viscosity being a viscosity of a 2 weight percent solution of the polymer in o-dichlorobenzene at 120° C.,
   b. polymers of vinyl chloride with up to 20 weight percent of a monoolefinically unsaturated monomer copolymerizable therewith selected from a group consisting of methyl methacrylate, ethyl acrylate, vinyl acetate, methyl styrene, diethyl maleate, acrylonitrile and butadiene,
   c. blends of polyvinyl chloride as set forth in (a) with from 3–30 weight percent (based on the blend of polymer selected from the polymers of (b)) and isotactic polybutadiene,
   providing a heat-plastified sheet of an alkenyl aromatic resinous polymer of 50–90 weight percent of an alkenyl aromatic monomer containing from six to 10 carbon atoms of the benzene series and having the vinyl group directly attached to the ring and from 10 to 34 weight percent acrylonitrile and from 0 to 20 weight percent polybutadiene,
   contacting the heat-plastified sheet of alkenyl aromatic resinous polymer with the sheet of vinyl chloride polymer under pressure sufficient to cause bonding of the vinyl chloride polymer to the alkenyl aromatic resinous polymer and subsequently cooling the resultant composite sheet below its thermoplastic temperature.

2. The method of claim 1 wherein the alkenyl aromatic resinous sheet is extruded onto the surface of the vinyl chloride sheet and while the alkenyl aromatic resinous polymer is in heat-plastified condition, the sheets are pressed together between adjacent rolls.

3. The method of claim 1 wherein the vinyl chloride polymer is polyvinyl chloride plasticized with di-2-ethyl hexyl phthalate.

4. The method of claim 1 wherein the vinyl chloride polymer is about 70 weight percent polyvinyl chloride blended with about 30 weight percent of a copolymer of 80 weight percent methyl methacrylate and 20 weight percent ethyl acrylate.

5. The method of claim 9 wherein the vinyl chloride polymer is a blend of 60 weight percent polyvinyl chloride and 40 weight percent of a polymer which is 80 weight percent polyvinyl chloride having polymerized therein 20 weight percent of a mixture which is 16 weight percent methyl styrene, 39 weight percent butadiene, 39 weight percent methyl methacrylate and 6 weight percent ethyl acrylate.

6. The method of claim 1 wherein the alkenyl aromatic resinous polymer is a polymer of from about 66 weight percent styrene to about 34 weight percent acrylonitrile.

7. The method of claim 1 wherein the alkenyl aromatic resinous polymer is a polymer containing a major portion of styrene with minor amounts of acrylonitrile and polybutadiene rubber.

8. The method of claim 1 wherein the alkenyl aromatic monomer is styrene.

9. The method of claim 1 wherein the alkenyl aromatic monomer is a mixture of tertiary butyl styrene and styrene.

10. A method for preparing a laminate of a vinyl chloride polymer comprising preparing a sheet of a vinyl chloride polymer, the vinyl chloride polymer being selected from the group consisting of:
  a. polyvinyl chloride having a solution viscosity of from about 1.5 to about 3 centipoise, the solution viscosity being a viscosity of a 2 weight percent solution of the polymer in o-dichlorobenzene at 120° C.,
  b. polymers of vinyl chloride with up to 20 weight percent of a monoolefinically unsaturated monomer copolymerizable therewith selected from a group consisting of methyl methacrylate, ethyl acrylate, vinyl acetate, methyl styrene, diethyl maleate, acrylonitrile and butadiene,
  c. blends of polyvinyl chloride as set forth in (a) with from 3-30 weight percent (based on the blend of polymer selected from the polymers of (b)) and isotactic polybutadiene, extruding a heat-plastified sheet of an alkenyl aromatic resinous polymer of 50-90 weight percent of an alkenyl aromatic monomer containing from six to 10 carbon atoms of the benzene series and having the vinyl group directly attached to the ring and from 10 to 34 weight percent acrylonitrile and from 0 to 20 weight percent polybutadiene, contacting the heat-plastified sheet of alkenyl aromatic resinous polymer with the sheet of vinyl chloride polymer under pressure sufficient to cause bonding of the vinyl chloride polymer to the alkenyl aromatic resinous polymer, and subsequently cooling the resultant composite sheet below its thermoplastic temperature.

* * * * *

PO-1050
(5/69)

UNITED STATES PATENT OFFICE
CERTIFICATE OF CORRECTION

Patent No. 3,634,165      Dated January 11, 1972

Inventor(s) Vern L. Gliniecki and Kenneth E. Flammang

It is certified that error appears in the above-identified patent and that said Letters Patent are hereby corrected as shown below:

Column 1, line 2, after "1967." insert -- , now abandoned.--

Column 4, line 16, after "40" insert -- weight --.

Column 6, line 64, in Claim 5, change number "9" to -- 1 --.

Signed and sealed this 11th day of July 1972.

(SEAL)
Attest:

EDWARD M. FLETCHER, JR.
Attesting Officer

ROBERT GOTTSCHALK
Commissioner of Patents